(12) United States Patent
Jiang et al.

(10) Patent No.: US 8,802,279 B2
(45) Date of Patent: Aug. 12, 2014

(54) BATTERY COVER ASSEMBLY AND BATTERY HAVING THE SAME

(75) Inventors: Luxia Jiang, Shenzhen (CN); Dongna Shi, Shenzhen (CN); Wenya Pi, Shenzhen (CN); Qing Lai, Shenzhen (CN); Jianhua Zhu, Shenzhen (CN)

(73) Assignees: Shenzhen BYD Auto R&D Company Limited, Shenzhen (CN); BYD Company Limited, Shenzhen (CN)

( * ) Notice: Subject to any disclaimer, the term of this patent is extended or adjusted under 35 U.S.C. 154(b) by 127 days.

(21) Appl. No.: 13/533,915

(22) Filed: Jun. 26, 2012

(65) Prior Publication Data

US 2013/0004834 A1    Jan. 3, 2013

(30) Foreign Application Priority Data

Jun. 29, 2011   (CN) .................. 2011 2 0223640 U (51) Int. Cl.
*H01M 2/06* (2006.01)
*H01M 2/08* (2006.01)
*H01M 2/04* (2006.01)

(52) U.S. Cl.
USPC ........................... 429/179; 429/181; 429/185

(58) Field of Classification Search
CPC ........................................................ H01M 2/30
USPC ........................................ 429/179–181, 185
See application file for complete search history.

(56) References Cited

U.S. PATENT DOCUMENTS

2003/0186120 A1*  10/2003  Wang et al. ................... 429/178
2006/0115727 A1*   6/2006  Kim et al. ..................... 429/181

FOREIGN PATENT DOCUMENTS

| CN | 1716657 A | 1/2006 |
|----|-----------|--------|
| CN | 202167550 U | 3/2012 |
| JP | H11154503 A | 6/1999 |
| JP | 2005339990 A * | 12/2005 |
| JP | 2007019017 A * | 1/2007 |
| JP | 2009087612 A | 4/2009 |

* cited by examiner

*Primary Examiner* — Gregg Cantelmo
(74) *Attorney, Agent, or Firm* — Morgan, Lewis & Bockius LLP (57) ABSTRACT

A battery and a battery cover assembly thereof are provided. The battery cover assembly comprises a cover (1) having a through hole; an extraction electrode terminal (3); and an insulating seal member disposed between the cover and the extraction electrode terminal. The extraction electrode terminal (3), starting from its top, includes a columnar seal part (31), a position part (32) and a weld part (33) that are consecutively connected together, the columnar seal part (31) passing through the through hole of the cover and having a seal groove formed along a circumferential surface thereof, the position part (32) having a horizontally-oriented platform, and the weld part (33) having a sheet-like shape and being perpendicular to the horizontally-oriented platform of the position part.

12 Claims, 6 Drawing Sheets

BATTERY COVER ASSEMBLY AND BATTERY HAVING THE SAME

CROSS REFERENCE TO RELATED APPLICATIONS

This application claims priority and benefits of Chinese Patent Application No. 201120223640.0, filed with State Intellectual Property Office, P.R.C. on Jun. 29, 2011, the entire content of which is incorporated herein by reference.

TECHNICAL FIELD

The present disclosure generally relates to the technical field of power battery, more particularly, to a battery cover assembly and a battery having the same.

BACKGROUND ART

Since non-renewable resources such as oil are being gradually exhausted and the associated environment pollution is getting more and more serious, people expect much more from vehicles powered by clean energy. As the heart of a clean energy-powered vehicle, the power battery may be subject to external impacts like vibration and collision at operation due to the high mobility of the vehicle. Therefore, there is a high requirement for the safety and reliability of a power battery. Meanwhile, the requirements for the size and weight of the power battery as a mobile energy supplying device are also high.

A conventional battery cover assembly comprises an extraction electrode terminal having a columnar structure, which helps to seal the battery. However, because of a small welding area, it is difficult to weld the extraction electrode terminal and a tab together. Another conventional battery cover assembly includes an extraction electrode terminal having a sheet structure. Although it increases the welding area of the extraction electrode terminal, which makes it easy to weld the extraction electrode terminal and the tab together, the sheet structure makes it difficult for an extraction electrode terminal having such structure to seal the power battery.

SUMMARY OF THE DISCLOSURE

Embodiments of the present disclosure seek to, at least to some extent, solve at least one of the problems existing in the prior art.

Embodiments of a first aspect of the present disclosure provide a battery cover assembly having a good sealing effect and easy to weld.

Embodiments of a second aspect of the present disclosure provide a battery having a good sealing effect and easy to weld.

A battery cover assembly according to embodiments of the present disclosure comprises: a cover having a through hole; an extraction electrode terminal; and an insulating seal member disposed between the cover and the extraction electrode terminal Starting from its top, the extraction electrode terminal includes, in a sequence, a columnar seal part, a position part, and a weld part. The columnar seal part passes through the through hole in the cover such that the insulating seal member is sealed between the cover and the seal part of the extraction electrode terminal The seal part includes a seal groove formed along a circumferential surface thereof, the position part includes a horizontally-oriented platform, and the weld part has a sheet-like structure and is perpendicular to the position part.

According to some embodiments of the present disclosure, because the extraction electrode terminal has a columnar seal part, and the seal groove is formed along the circumferential surface of the seal part, the battery cover provides a better sealing between the insulating seal part and the seal part, and the battery using the battery cover is also better sealed.

Moreover, because the weld part has a sheet-like structure and is perpendicular to the position part, there is enough space for one to weld a battery tab and the extraction electrode terminal together, resulting a more simplified welding process between the battery tab and the extraction electrode terminal. Therefore, the overall safety of the battery is improved.

In some embodiments, the weld part is disposed at the center of a bottom surface of the position part and has a T-shape in a cross-sectional view of the extraction electrode terminal.

In some embodiments, the weld part is disposed at one side of a bottom surface of the position part and has an L-shape in a cross-sectional view of the extraction electrode terminal.

In some embodiments, the weld part is disposed at both sides of a bottom surface of the position part and has an inverted U-shape in a cross-sectional view of the extraction electrode terminal.

In some embodiments, a position step is formed at the top of the seal part.

In some embodiments, the position step has a circular ring shape.

In some embodiments, the seal groove has a rectangle shape in a cross-sectional view.

In some embodiments, there is an arc-shape transition between the weld part and position part.

In some embodiments, there is a straight chamfer or a round chamfer at an edge of the position part.

In some embodiments, the seal part is disposed at a center of an upper surface of the position part.

In some embodiments, the cover has a sleeve part and a flange part connected to a lower end of the sleeve part.

In some embodiments, the insulating seal member has an inner sleeve, a lower flange connected to a lower end of the inner sleeve, and an outer sleeve fitted over the inner sleeve so as to define an annular space therebetween, and an upper end of the outer sleeve is connected to an upper end of the inner sleeve so as to close the upper end of the annular space, and wherein the sleeve part of the cover is inserted into the annular space.

In some embodiments, a protrusion is formed on an inner wall of the inner sleeve and fitted within the seal groove.

A battery according to the embodiments of the present disclosure comprises: a case; a battery cover assembly disposed at an end of the case, wherein the battery cover assembly is any one of the embodiments mentioned above; and an electric core disposed within a chamber defined by the case and the battery cover assembly.

The battery according to the embodiments of the present disclosure has a good sealing effect and is easy to weld.

The summary above of the present disclosure is not intended to describe each disclosed embodiment or every implementation of the present disclosure. The Figures and the detailed description which follow more particularly exemplify illustrative embodiments.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference the accompanying drawings, in which.

DETAILED DESCRIPTION

Reference will be made in detail to embodiments of the present disclosure.

The battery cover assembly according to embodiments of the present disclosure will be described below with reference of FIGS. 1 to 6.

Figure 1:
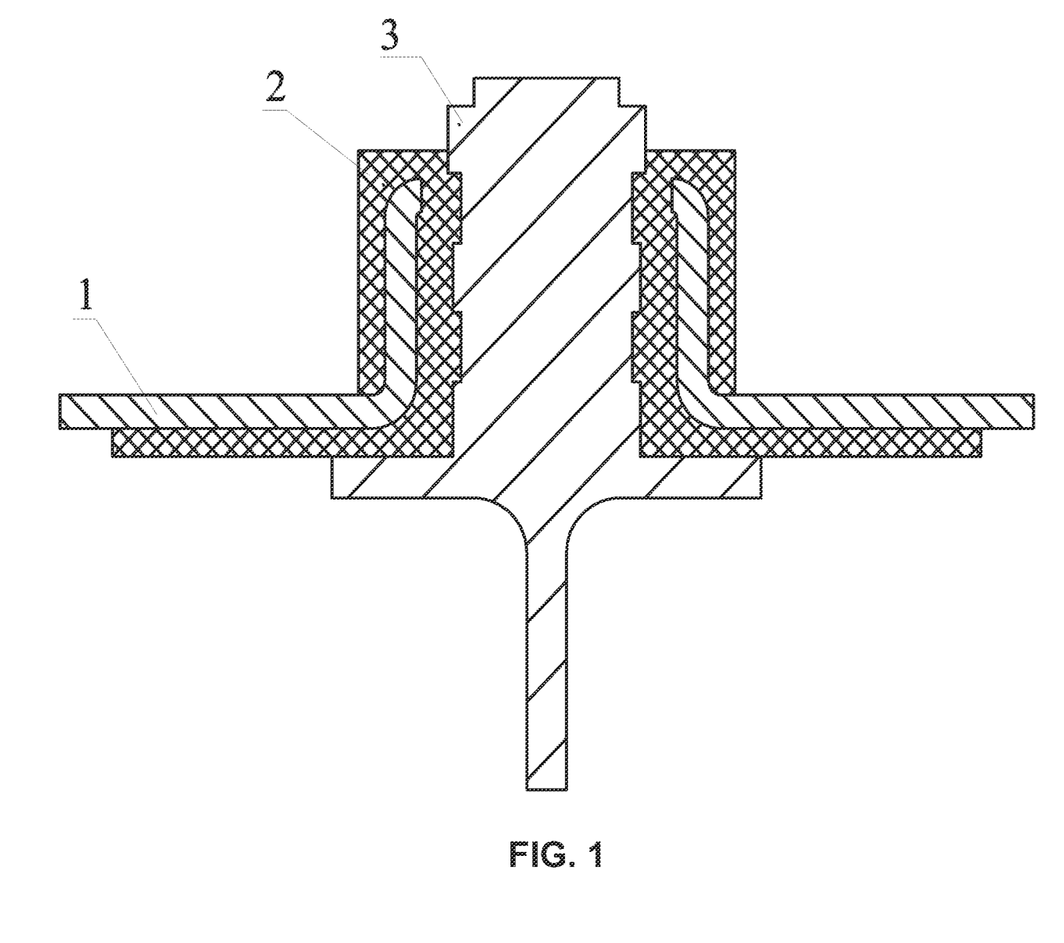
FIG. 1 depicts a battery cover assembly having a T-shape cross-sectional view according to an embodiment of the present disclosure.
Figure 2:
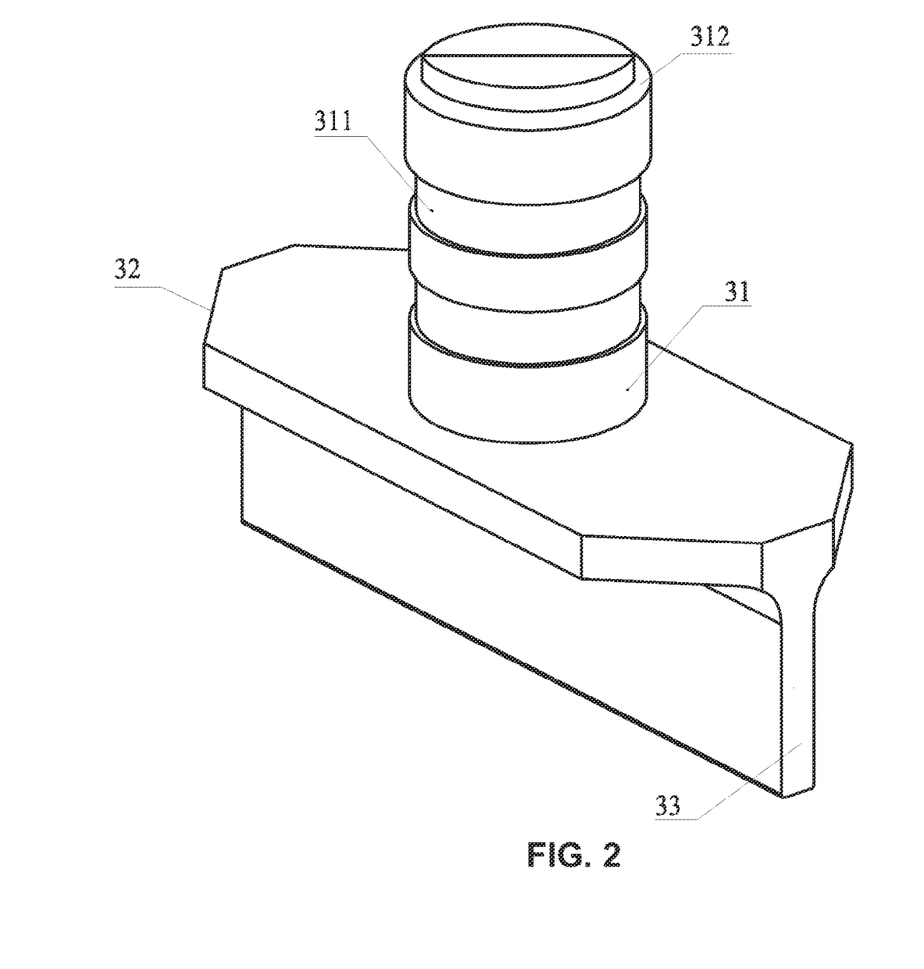
FIG. 2 depicts a perspective view of a T-shape extraction electrode terminal in the battery cover assembly according to an embodiment of the present disclosure.
Figure 4:
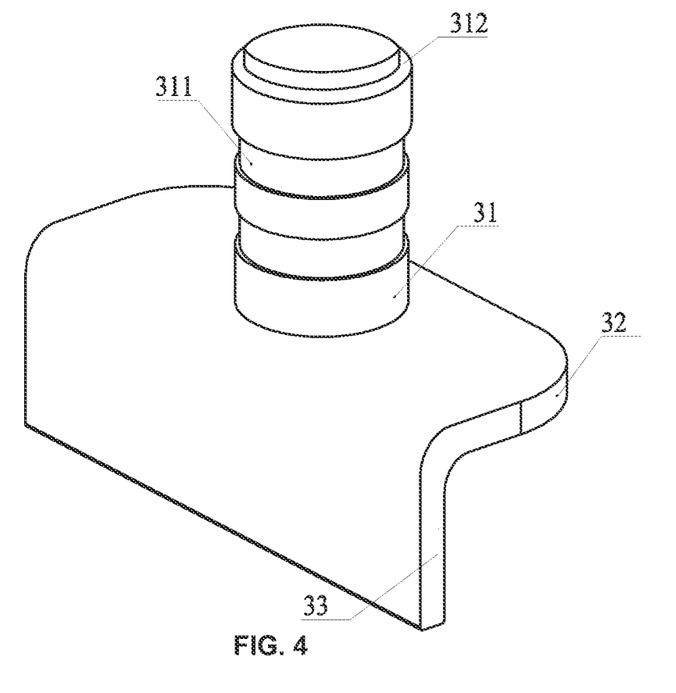
FIG. 4 depicts a perspective view of an L-shape extraction electrode terminal in the battery cover assembly according to an embodiment of the present disclosure.
Figure 6:
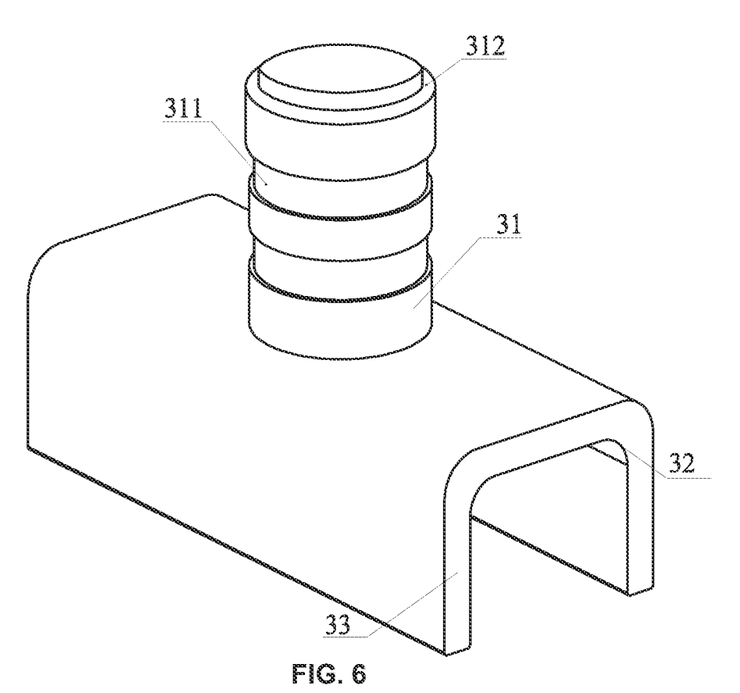
FIG. 6 depicts a perspective view of a U-shape extraction electrode terminal in the battery cover assembly according to an embodiment of the present disclosure.

As shown in FIG. 1, the battery cover assembly according to an embodiment of the present disclosure comprises a cover 1 having a through hole, an extraction electrode terminal 3 and an insulating seal member 2 disposed between the cover 1 and the extraction electrode terminal 3. Starting from its top, the extraction electrode terminal 3 includes a seal part 31, a position part 32 and a weld part 33, which are consecutively connected together as shown in FIG. 1. The seal part 31 has a columnar shape and passes through the through hole of the cover 1. A seal groove 311 is formed along a circumferential surface of the seal part 31. The position part 32 includes a horizontally-oriented platform, as shown in FIGS. 2, 4 and 6, and the weld part has a sheet-like (or plate-like) shape and is perpendicular to the position part 32.

According to some embodiments of the present disclosure, because the extraction electrode terminal 3 has a columnar seal part 31, and the seal groove 311 is formed along the circumferential surface of the seal part 31, the battery cover assembly provides a better sealing between the insulating seal part 2 and the seal part 31, and the battery using this battery cover assembly is also better sealed.

Moreover, because the weld part 33 has a sheet-like (or plate-like) structure and is perpendicular to the position part 32, there is enough space for one to weld a battery tab and the extraction electrode terminal together, resulting a more simplified welding process between the battery tab and the extraction electrode terminal. Therefore, the overall safety of the battery is improved.

There is no special requirement for the material of the cover 1, and the cover 1 may be made of aluminum or steel, preferably the cover 1 is made of aluminum.

There is no special requirement for the material of the insulating seal member 2, and the insulating seal members 2 may be made of ceramic, glass, plastic or rubber. If the insulating seal member 2 is made of ceramic or glass, the insulating seal member 2 may be sealed between the cover 1 and the extraction electrode terminal 3 using a sintering process. If the insulating seal member 2 is made of plastic or rubber, the insulating seal member 2 may be sealed between the cover 1 and the extraction electrode terminal 3 using an injection-molding process.

In some embodiments, the seal part 31 of the extraction electrode terminal 3 is in the shape of a cylindrical column, a polygonal prism, or a circular boss, preferably the seal part 31 is formed as a cylindrical column. The seal part 31 is disposed at a center of an upper surface of the position part 32.

In some embodiments of the present disclosure, a plurality of the seal grooves 311 is formed along the circumferential surface of the seal part 3 and they are further spaced apart in the axial direction of the seal part 3. The plurality of the seal grooves 311 may be extended around the seal part 3 to form annular grooves. The cross-sectional view of the seal groove 311 may have one of a rectangular shape, a trapezoidal shape or a semicircular shape, preferably the seal groove 311 has a rectangular axial cross-sectional view. The seal part 31 may be in a shape of a cylindrical column so as to improve the sealing effect of battery. The seal grooves 311 formed in the circumferential surface of the seal part 3 improves the tightness of engagement between the insulating seal member 2 and the seal part 31 so as to further improve the sealing effect of battery.

A position step 312 is formed at the top of the seal part 31. Preferably the position step 312 is formed as an annular step at an edge of the top of the seal part 31. The seal part 31 with the position step 312 makes the assembly of the battery more accurate.

There is no special requirement for the manner of coupling the weld part 33 to the position part 32, and the weld part 33 and position part 32 may be formed in a one-body integral structure or a structure including multiple components that are coupled to each other, preferably, the weld part 33 and position part 32 is formed in a one-body integral structure.

Moreover, an arc-shape transition can be used to couple the weld part 33 and position part 32 together, so that current can be transmitted smoothly to avoid phenomena such as a local large current density increase and a local overheat due to a dramatic change of the conductive structure and an improved reliability of the battery.

The position part 32 may be disposed between the seal part 31 and weld part 33, and connected to the seal part 31 and weld part 33. There is no special requirement for the shape of the position part 32. When the position part 32 is a platform having regular shape and edges, the edges of the position part 32 may be chamfered or rounded. Preferably, the position part 32 may have an oval contour to reduce the weight and cost of the battery while keeping its current conducting capability.

According to different shapes and locations of the battery tab, there are different locations at which the weld part 33 and position part 32 are connected together.

As shown in FIGS. 1 and 2, the weld part 33 is disposed at the center of a bottom surface of the position part 32, so that the weld part 33 and the position part 32, when viewed together, has a T-shape in a cross-sectional view of the extraction electrode terminal.

Figure 3:
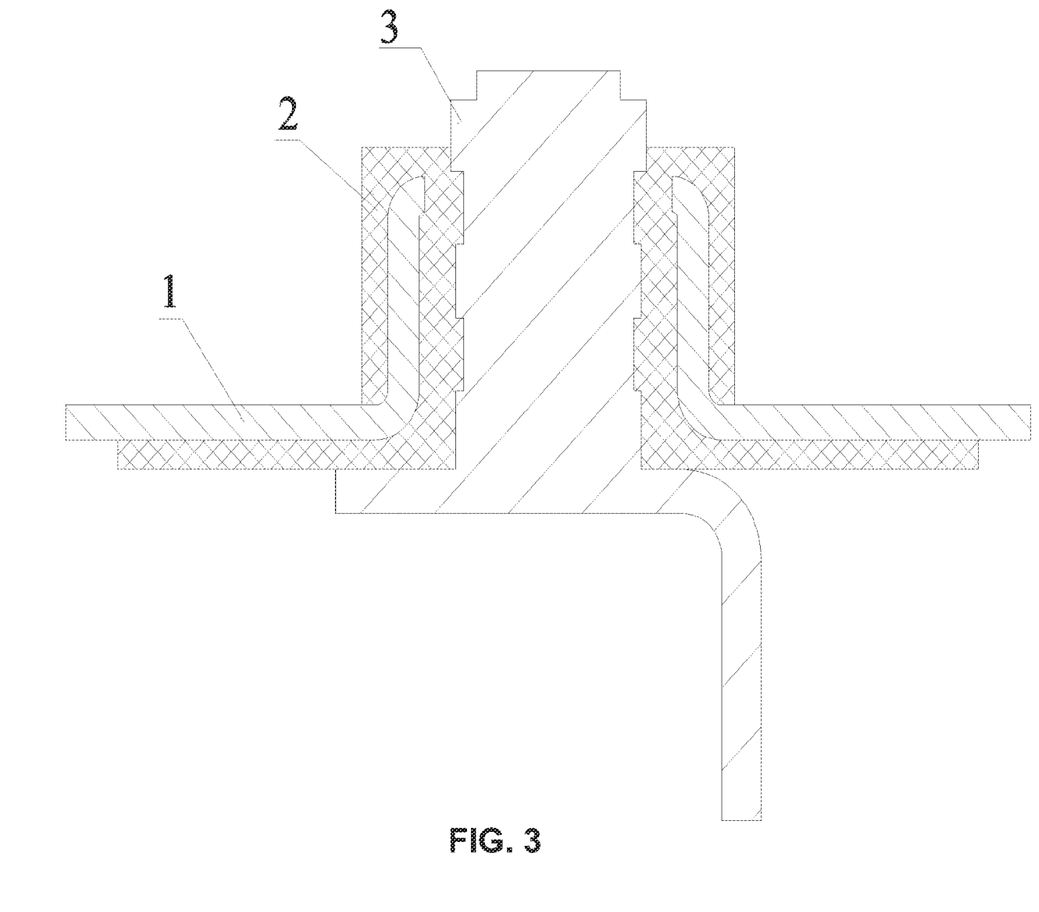
FIG. 3 depicts a battery cover assembly having an L-shape cross-sectional view according to an embodiment of the present disclosure.

As shown in FIGS. 3 and 4, the weld part 33 is disposed at one side of the bottom surface of the position part 32, so that the weld part 33 and the position part 32 has an L-shape in a cross-sectional view.

Figure 5:
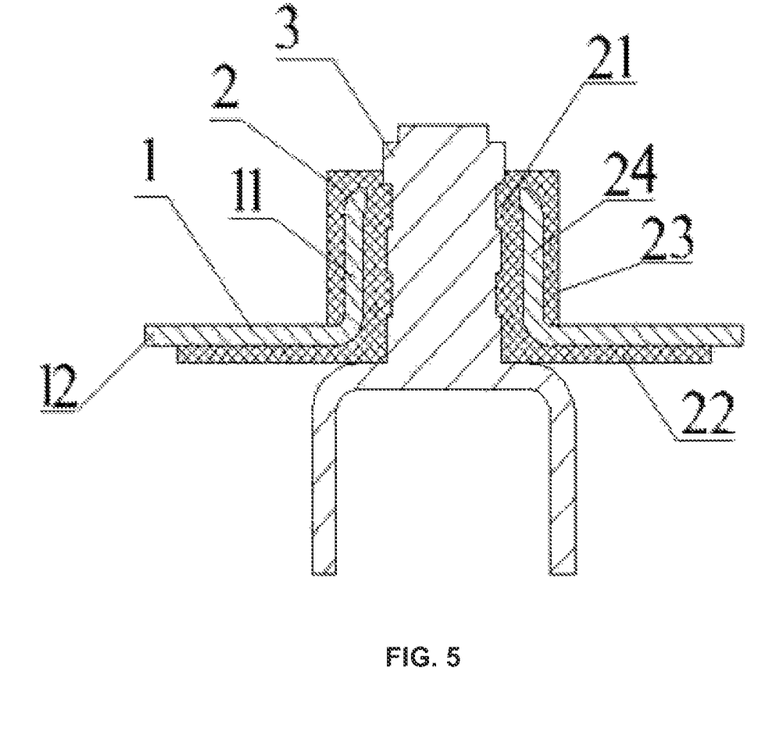
FIG. 5 depicts a battery cover assembly having an U-shape cross-sectional view according to an embodiment of the present disclosure.

As shown in FIGS. 5 and 6, the weld part 33 is disposed at both sides of the bottom surface of the position part 32, so that the weld part 33 and the position part 32 has an inverted U-shape in a cross-sectional view.

The aforementioned manners of connecting the weld part 33 and position part 32 together provide enough space for welding the battery tab and the extraction electrode terminal 3, and it also simplifies the process for welding the battery tab and the extraction electrode terminal 3.

Moreover, the structure and configuration of the battery tab may be well known by those skilled in the art, so that detailed descriptions thereof are omitted here.

As shown in FIG. 5, the cover 1 has a sleeve part 11 and a flange part 12 connected to a lower end of the sleeve part 11. The insulating seal member 2 has an inner sleeve 21, a lower flange 22 connected to a lower end of the inner sleeve 21, and an outer sleeve 23 fitted over the inner sleeve 21 to define an annular space 24 therebetween. An upper end of the outer sleeve 23 is connected to an upper end of the inner sleeve 21 to close the upper end of the annular space 24. The sleeve part 11 of the cover 1 is inserted into the annular space 24, so that the insulating seal member 2 can be tightly engaged with the cover 1.

Preferably, a protrusion may be formed on an inner wall of the inner sleeve 21 and fitted within the seal groove 311, therefore, the sealing effect between the cover 1 and the extraction electrode terminal 3 can be further improved.

The battery according to some embodiments of the present disclosure will be described below.

The battery according to some embodiments of the present disclosure comprises: a case, a battery cover assembly disposed at an end of the case and an electric core disposed within a chamber defined by the case and the battery cover assembly. The battery cover assembly may be any one described with reference to the embodiments above.

The battery according to the embodiments of the present disclosure may not only improve the sealing effect thereof, but also simplify the welding process thereof.

The case and the electric core are known by those skilled in the art, so that detailed descriptions thereof are omitted here.

The embodiments described above with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, it is to be understood that phraseology and terminology used herein with reference to device or element orientation (such as, for example, terms like "central," "upper," "lower," "front," "rear," and the like) are only used to simplify description of the present invention, and do not alone indicate or imply that the device or element referred to must have a particular orientation.

In addition, terms such as "first" and "second" are used herein for purposes of description and are not intended to indicate or imply relative importance or significance.

It is to be noted that, through the description and claims of this specification, the words "comprise", "include", "have" and variations thereof, such as "comprising", "comprises", "includes" or "including", "has" or "having", are not intended to exclude other variants or additional components, integers or steps.

Reference throughout this specification to "an embodiment," "some embodiments," "one embodiment", "another example," "an example," "a specific examples," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example, "in an example," "in a specific examples," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A battery cover assembly, comprising:
    a cover having a through hole;
    an extraction electrode terminal; and
    an insulating seal member disposed between the cover and the extraction electrode terminal,
    wherein the extraction electrode terminal, starting from its top, includes a columnar seal part, a position part and a weld part that are consecutively connected together, the columnar seal part passing through the through hole of the cover and having a seal groove formed along a circumferential surface thereof, the position part having a horizontally-oriented platform, and the weld part having a sheet-like shape and being perpendicular to the horizontally-oriented platform of the position part, wherein there is a position step at a top of the seal part.

2. The battery cover assembly as set forth in claim 1, wherein the weld part is disposed at a center of a bottom surface of the position part and a combination of the position part and the weld part has a T-shape in a cross-sectional view of the extraction electrode terminal.

3. The battery cover assembly as set forth in claim 1, wherein the weld part is disposed at one side of a bottom surface of the position part and a combination of the position part and the weld part has an L-shape in a cross-sectional view of the extraction electrode terminal.

4. The battery cover assembly as set forth in claim 1, wherein the weld parts is disposed at both sides of a bottom surface of the position part and a combination of the position part and the weld part has an inverted U-shape in a cross-sectional view of the extraction electrode terminal.

5. The battery cover assembly as set forth in claim 1, wherein the position step has a circular ring shape.

6. The battery cover assembly as set forth in claim 1, wherein the seal groove has a rectangle shape in a cross-sectional view passing through an axis of the seal part.

7. The battery cover assembly as set forth in claim 1, wherein there is one of a straight chamfer and a round chamfer formed at an edge of the position part.

8. The battery cover assembly as set forth in claim 1, wherein the seal part is disposed at a center of an upper surface of the position part.

9. The battery cover assembly as set forth in claim 1, wherein the cover has a sleeve part and a flange part connected to a lower end of the sleeve part, wherein the insulating seal member having an inner sleeve, a lower flange connected to a lower end of the inner sleeve, and an outer sleeve fitted over the inner sleeve so as to define an annular space therebetween, an upper end of the outer sleeve being connected to an upper end of the inner sleeve so as to close an upper end of the annular space, and wherein the sleeve part of the cover is inserted into the annular space.

10. The battery cover assembly as set forth in claim 9, wherein a protrusion is formed on an inner wall of the inner sleeve and fitted within the seal groove.

11. A battery cover assembly, comprising:

a cover having a through hole;

an extraction electrode terminal; and an insulating seal member disposed between the cover and the extraction electrode terminal, wherein the extraction electrode terminal, starting from its top, includes a columnar seal part, a position part and a weld part that are consecutively connected together, the columnar seal part passing through the through hole of the cover and having a seal groove formed along a circumferential surface thereof, the position part having a horizontally-oriented platform, and the weld part having a sheet-like shape and being perpendicular to the horizontally-oriented platform of the position part, wherein there is an arc-shape transition between the weld part and position part.

12. A battery, comprising:

a case;

a battery cover assembly disposed an end of the case, wherein the battery cover assembly further comprises:

a cover having a through hole;

an extraction electrode terminal; and an insulating seal member disposed between the cover and the extraction electrode terminal, wherein the extraction electrode terminal, starting from its top, includes a columnar seal part, a position part and a weld part which are consecutively connected together, the columnar seal part passing through the through hole of the cover and having a seal groove formed along a circumferential surface thereof, the position part having a horizontally-oriented platform, and the weld part having a sheet-like shape and being perpendicular to the horizontally-oriented platform of the position part, there is a position step at a top of the seal part; and an electric core disposed within a chamber defined by the case and the battery cover assembly.

* * * * *